O. A. SMITH.
VALVE STEM CAP.
APPLICATION FILED MAR. 4, 1916.
1,242,995.
Patented Oct. 16, 1917.
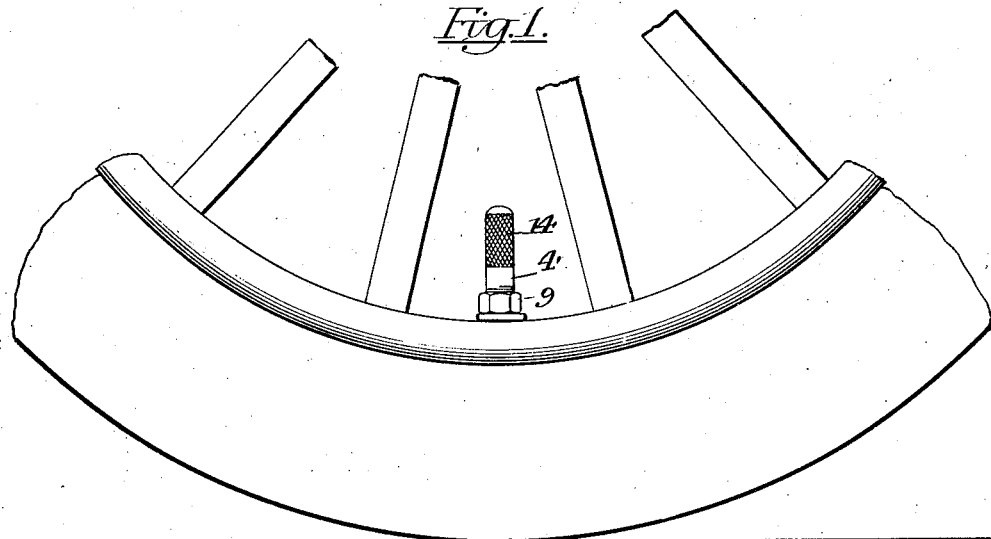
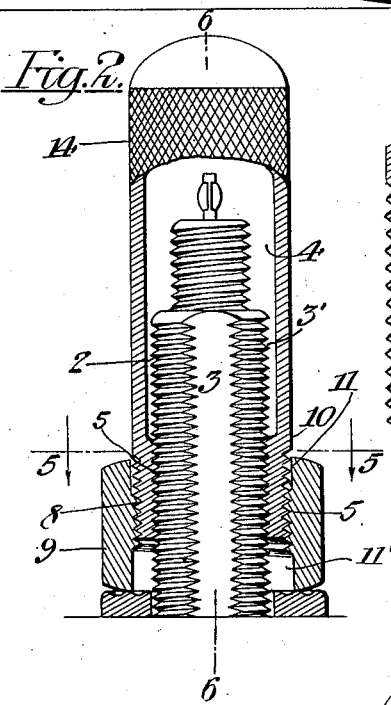
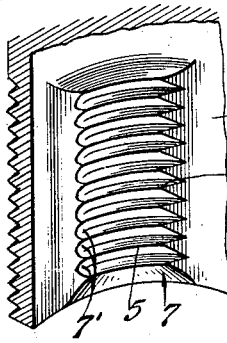
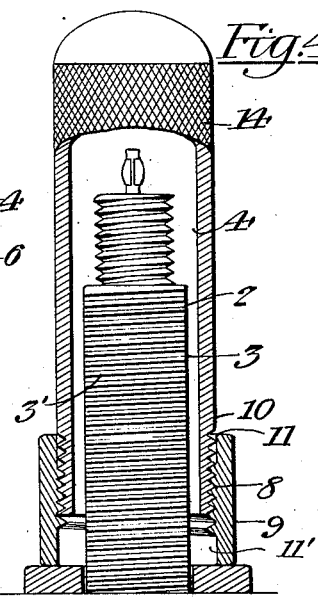
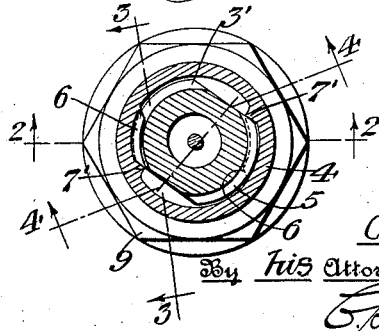
Witness:
Titus H. Ime
Inventor
Oscar A. Smith
By his Attorney

UNITED STATES PATENT OFFICE.

OSCAR A. SMITH, OF CLEVELAND, OHIO, ASSIGNOR OF ONE-HALF TO EDWIN C. HENN, OF CLEVELAND, OHIO.

VALVE-STEM CAP.

1,242,995.   Specification of Letters Patent.   Patented Oct. 16, 1917.

Application filed March 4, 1916. Serial No. 82,019.

*To all whom it may concern:*

Be it known that I, OSCAR A. SMITH, a citizen of the United States, residing at Cleveland, in the county of Cuyahoga and State of Ohio, have invented certain new and useful Improvements in Valve-Stem Caps, of which the following is a specification.

This invention relates to improvements in valve stem caps, and more particularly to improvements in that class of valve stem caps which are used in connection with pneumatic tires, such as automobile tires, the object of the invention being to provide a protecting cap for such valve stems which can be placed on the stem and very easily, quickly and firmly locked thereon against displacement, without the necessity of screwing the cap for the entire length of the stem, and by means of which the time consumed in removing and replacing the cap is reduced to a mere fraction of the time heretofore necessary to perform this operation, and which cap can be readily and quickly produced on an automatic screw machine like the ordinary caps, the present invention being an improvement in part upon my contemporaneously pending allowed application Serial No. 879,435, filed December 29, 1914.

One of the objects of the present improvement is to provide a cap so constructed that it may be placed on the stem and removed therefrom not only in much less time than the ordinary caps as now used, but to provide a cap which cannot by any action of the user be forced beyond its proper locking position.

In the drawings accompanying and forming part of this specification, Figure 1 is a side elevation of a portion of a felly of a wheel, showing this improved valve stem cap applied thereto; Fig. 2 is an enlarged, partly sectional, side view of the cap, showing the same locked on the valve stem and taken on the line 2—2, Fig. 5; Fig. 3 is an enlarged fragmentary view illustrating the lower end of the cap and taken on the line 3—3, Fig. 5; Fig. 4 is a lengthwise sectional view taken on the line 6—6, Fig. 2, and also on the line 4—4, Fig. 5; and Fig. 5 is a cross-sectional view taken on the line 5—5, Fig. 2.

Similar characters of reference indicate corresponding parts in the different figures of the drawings.

All valve stems now in practical use for inner tubes of automobile tires are flattened on two sides and threaded to a standard diameter and pitch, and the protecting caps are threaded to the same pitch and screwed on such stems for the entire length of the stem which projects through the felly of the wheel. Moreover, the valve stem must be locked to the felly of the wheel in some way to prevent the inner tube from "creeping." The constant friction of the tube in the casing exerts a constant pull on the valve stem tending to pull it through, and if this stem is not locked this continuous strain will eventually bend it and thus ruin the tube. When the tire is mounted directly on the wheel a double lock is required, because the stem has only a narrow support in the felly, and for this purpose it is usual to use a round knurled nut in conjunction with the threaded cap to insure a good lock, while when the tire is mounted on a demountable rim and then attached to the wheel the valve stem goes through the demountable rim and the felly and therefore does not require the double lock, since it has a considerably longer bearing by passing through the demountable rim and the felly, and consequently merely a washer having a bore corresponding in shape with the stem is used and the protecting cap screwed tightly against it.

In the present improvement the usual form of threaded stem 2 is used, having opposite portions thereof flattened, as at 3. In connection with this stem I employ a protecting cap 4, which is threaded only at one portion of its length, as for instance at its outer end, as at 5, Figs. 2, 3 and 4, and these threads do not extend entirely around the inner wall of the bore of the cap, but are broken away at opposite portions, as shown at 6, corresponding to the threaded portions 3' of the valve stem. In short, the valve stem as usually formed is provided with mutilated threads, and in the present improvement the valve cap is likewise provided with mutilated threads at its open or outer end, on the interior thereof. The purpose of thus forming the threads in the bore of the cap is to enable the cap to be slid over the stem to the end thereof without the necessity of screwing or unscrewing such cap throughout the entire length of the valve stem, and by a single turn or twist of the cap to bring its threads into engagement with the threads on the stem, thereby to lock the cap on such stem.

In my prior improvement, in order to provide a proper camming action between the threads on the stem and those on the cap, thereby to effectively lock the stem and cap together, I provided the cap with an extra thread, or a thread of a different pitch from that of the stem, but in the present improvement this differential or extra thread is eliminated. In my said prior improvement, if the user failed to push the cap all the way on the stem it happened that if there was a little variation in the diameter of the stem it would be possible for one not familiar with the cap to twist it to such an extent that the cap would turn by the threaded portions on the stem, so that there was danger of its loosening or dropping off, this being especially the case if the stem of the tube was not drawn up completely through the rim, caused by not having the tire completely inflated, so that, in short, the prior improvement was not exactly "foolproof", although very effective in its action when properly placed on the stem. In the present improvement this disadvantage is eliminated, and it is not necessary to instruct and inform the user what to do in order to put the cap on correctly, and the object referred to is obtained by so forming the mutilated thread sections on the interior of each cap that each threaded portion thereof is incomplete, as illustrated at 7, that is to say the threads of each mutilated section do not run clear over this portion, so that when the cap is screwed on the stem it can be turned partway around on the stem but cannot be screwed entirely over or off of the threaded portion of the stem. In other words, by reason of the fact that the thread is not complete on each mutilated portion it leaves what might be designated as a high spot or "land" at the rear end or side of each threaded section, as illustrated at 7', Fig. 3, so that when the cap is turned on to the threads of the stem this raised portion comes into contact with that portion of the stem where the threads join the flat side thereof and thus prevents the cap from being turned farther on the stem, so that even though the user should not push the cap entirely down on the stem he cannot turn it sufficiently far around on the stem to turn off the cap or bring the threads into alinement with the flat portions of the stem, which would of course cause the cap to be loose on the stem so that it would be likely to be jarred off.

The cap is provided on the exterior thereof with a circumferentially threaded portion 8, the threads of which are materially coarser than the threads of the mutilated interior portion, and on this coarse threaded exterior portion is located a nut 9, shown as of hexagon form, having of course similar coarse threads, the threaded portion at the outer end of the cap being relieved as at 10 and the threaded bore of the nut also relieved as at 11, and in practice the relieved or unthreaded portion at the outer end of the cap may be spun or flared outwardly into the unthreaded portion 11' at the lower end of the nut shown in Fig. 4, thereby to prevent separation of the nut from the cap when not in use.

In the present improvement the cap and its nut are slipped down on to the valve stem as far as the cap will go, and then the user merely tightens up on the nut to draw it into tight engagement with the washer carried by the valve stem, and this operation of tightening up this nut not only clamps the cap tightly on to the stem, but also draws the stem up into place. In other words, the action of tightening the nut against the rim or washer draws the valve stem in place, and then by further tightening this nut it locks the cap on to the stem. The friction present by reason of the coarse threads on the nut and valve cap causes the valve cap when the nut is tightened up to be turned on to the stem as far as the mutilated threads of the cap will allow it to go, and then further tightening of the nut results in a clamping action taking place lengthwise or longitudinally of the cap; in other words, the friction between the nut and the valve cap causes the cap to be rotated with the nut as far as the mutilated thread will permit the cap to turn on the stem, whereupon further rotation of the nut in the same direction until the nut is in contact with the felly, or the washer thereon, will exert an outward push on the cap in the direction of its length by reason of the fact that this direction of rotation is the one in which the nut would ordinarily be rotated to remove it from the cap, and this causes a very tight cramping or binding action between the upper sides of the threads of the cap and the lower sides of the threads of the stem, thus producing a very effective lock or what might be termed a compound lock.

Another advantage is that by reason of the fact that the mutilated threads on the interior of the cap are not completely tapped, as hereinbefore explained, when the cap is removed there is no danger of the cap catching the threads when the cap is turned to free it from the stem in order to remove it. In other words, the present improvement facilitates the quick removal of the cap and prevents the threads of the cap from catching the threads of the stem on the backward turning of the cap, so that the cap can be readily and quickly removed without any danger of the threads locking with the threads of the stem.

From the foregoing it will be seen that in order to use the present improvement it is only necessary to slip the cap over the valve stem until the nut of the cap comes in contact with the rim of the wheel, and then give the nut a turn or two. The coarse thread on the nut in contact with the coarse thread on the cap produces more friction than the mutilated thread on the cap in contact with the stem does, so that when the nut is turned it carries the cap on or into contact with the mutilated thread portion of the valve stem until such mutilated thread portions of the stem reach the incomplete or unthreaded portions of the cap, when the further turning of the cap is of course prevented, but the further turning of the nut differentially locks the nut to the wheel rim and also the cap, in other words clamps the cap to the rim and the stem to the cap, while of course clamping itself against the felly of the wheel or the washer which may be used.

In tapping the present improved caps I have used in practice a tap that has a thread with a sixty-four degree angle instead of a standard sixty degree, which the usual stem has, thus cutting a wider path for the thread on the stem to enter the cap. The cap shown is provided with the usual knurled portion 14 to permit the same to be readily turned by hand should it be desired to turn the cap on or off of the mutilated thread portions of the stem independently of the nut.

From the foregoing it will be seen that the present improvement comprises a cap having mutilated thread portions on its interior of a certain form, which will prevent the cap from being turned too far on to the mutilated thread portions of the stem, and a coarser thread portion on the exterior carrying a nut, by means of which the cap is clamped on to the stem in a very efficient and simple manner, and that all that is necessary in order to attach the cap is to place the cap on the stem and push it down as far as it will go, and then merely turn the nut to tighten it, whereupon this action will cause the cap to tighten itself upon the stem, thus locking it in position, and that to remove it all that is necessary is to reverse the foregoing operation.

From the foregoing it will be observed that I have provided an improved cap by means of which a large proportion of the time consumed in attaching and tightening the cap is saved, since it is merely necessary to slip the cap on the stem and give the nut thereof a twist.

I claim as my invention:

1. The combination with a felly and a threaded valve stem carried thereby, of an interiorly threaded valve cap adapted to fit said stem, the coöperating thread portions of the stem and cap being formed to prevent the cap from being turned beyond a certain point on the stem, and a nut carried by said valve cap and adapted to frictionally engage the same thereby to rotate said cap on said stem and to coöperate with said felly to force said cap outwardly in the direction of its length thereby to lock said cap on said stem, the cap and the nut both being rotated in the same direction.

2. The combination with a felly and a threaded valve stem carried thereby, of an interiorly and exteriorly threaded valve cap adapted to fit said stem, and a nut adapted to engage the exterior threads of said cap thereby to rotate said cap on said stem and to coöperate with said felly to force said cap outwardly in the direction of its length thereby to lock said cap on said stem, the threads of said stem, cap and nut all running in the same direction.

3. The combination with a felly and a threaded valve stem carried thereby, of a valve cap interiorly threaded to fit said stem and having a coarser thread at its outer side, and a nut also having a coarser thread adapted to engage the outer threads of the valve cap thereby to rotate said cap on said stem and to coöperate with said felly to force said cap outwardly in the direction of its length thereby to lock said cap on said stem, the threads of said stem, cap and nut all running in the same direction.

4. The combination with a felly and a valve stem carried thereby, said stem having a plurality of interrupted or mutilated thread portions, of an exteriorly threaded valve cap also having interiorly thereof a plurality of mutilated thread portions, the coöperating thread portions of said parts being formed to prevent the cap from being turned beyond a certain point on the stem and threaded means carried by the exterior threads of said cap and coöperating with said felly to force said cap outwardly in the direction of its length thereby to lock said cap on said stem, the threads of all the parts running in the same direction.

5. The combination with a felly and a valve stem carried thereby, said stem having a plurality of interrupted or mutilated thread portions, of a valve cap also having a plurality of mutilated thread portions, the coöperating thread portions of said parts being formed to prevent the cap from being turned beyond a certain point on the stem, and means at the exterior of said cap and coöperating with said felly to force said cap outwardly in the direction of its length thereby to lock said cap on said stem, the cap and said means being rotated in the same direction to lock said cap on said stem.

6. The combination with a felly and a valve stem carried thereby, said stem having a plurality of interrupted or mutilated thread portions, of a valve cap also having a plurality of mutilated thread portions, the coöperating thread portions of said parts being formed to prevent the cap from being tu.... d beyond a certain point on the stem, and a nut carried by said cap and coöperating with said felly to force said cap outwardly in the direction of its length thereby to cause a binding action between the threads of the cap and the threads of the stem to lock said cap on said stem, all the threads of the several parts running in the same direction.

7. The combination with a felly and a valve stem carried thereby, said stem having a plurality of interrupted or mutilated thread portions, of a valve cap having a plurality of incomplete mutilated thread portions adapted to prevent the cap from being turned beyond a certain point on the stem, said cap also having coarser threads at the exterior thereof, and a nut having threads adapted to fit the exterior threads of said cap and coöperating with said felly to force said cap outwardly in the direction of its length thereby to cause a binding action between the threads of the cap and the threads of the stem for locking said cap on said stem, the threads of all the parts running in the same direction.

8. An exteriorly threaded valve cap having interiorly thereof a plurality of incomplete mutilated thread portions adapted to coöperate with a mutilated threaded stem, and threaded means carried by the exterior threads of said cap and adapted to rotate said cap and also coöperate with the felly carrying the valve stem with which the cap is designed to be used thereby to force said cap outwardly in the direction of its length and lock the mutilated threads of the cap in contact with the threads of said stem, the threads of all the parts running in the same direction.

9. A valve cap having a plurality of incomplete mutilated thread portions interiorly thereof adapted to coöperate with a mutilated threaded valve stem and coarser threads at its exterior, and a nut having threads adapted to fit the exterior threads of said cap and also adapted to coöperate with the felly carrying the valve stem with which the cap is designed to be used thereby to force said cap outwardly in the direction of its length and lock the mutilated threads of the cap in contact with the threads of said stem, all the threads of the several parts running in the same direction.

Signed at Cleveland, in the county of Cuyahoga and State of Ohio, this 2nd day of March, 1916.

OSCAR A. SMITH.